United States Patent [19]

Böhm et al.

[11] Patent Number: 4,971,386
[45] Date of Patent: Nov. 20, 1990

[54] SLIDING LIFTING ROOF FOR MOTOR VEHICLES

[75] Inventors: Horst Böhm, Frankfurt am Main; Rainer Grimm, Wetzlar, both of Fed. Rep. of Germany

[73] Assignee: Rockwell-Golde G.m.b.H., Fed. Rep. of Germany

[21] Appl. No.: 377,038

[22] Filed: Jul. 10, 1989

[30] Foreign Application Priority Data

Jul. 22, 1988 [DE] Fed. Rep. of Germany ....... 3824942

[51] Int. Cl.⁵ .................... B60J 7/05; B62D 25/07
[52] U.S. Cl. ............................. 296/213; 296/221
[58] Field of Search ................. 296/213, 221, 222

[56] References Cited

U.S. PATENT DOCUMENTS 4,537,442  8/1985  Jardin ............................. 296/221
4,664,439  5/1987  Schaetzler ..................... 296/221 X
4,671,565  6/1987  Grimm et al. .................. 296/213 X
4,828,318  5/1989  Reintges ........................ 296/213

Primary Examiner—Dennis H. Pedder

[57] ABSTRACT

In a sliding lifting roof for motor vehicles a water trapping strip is resiliently fixed to a water deflector underpinning the rear marginal gap between a trailing edge of a sliding cover and the rear edge of the roof opening. The water trapping strip is biased by spring tension in the sense of an upward displacement, so that when the sliding cover is open it projects upwards over the rear edge of the roof opening with a splash guard. In the case of braking during forward travel and with the sliding cover open, splashed water from the surface of the rear, fixed vehicle roof is trapped by the splash guard and is passed by the water trapping strip to the underlying water deflector.

9 Claims, 3 Drawing Sheets

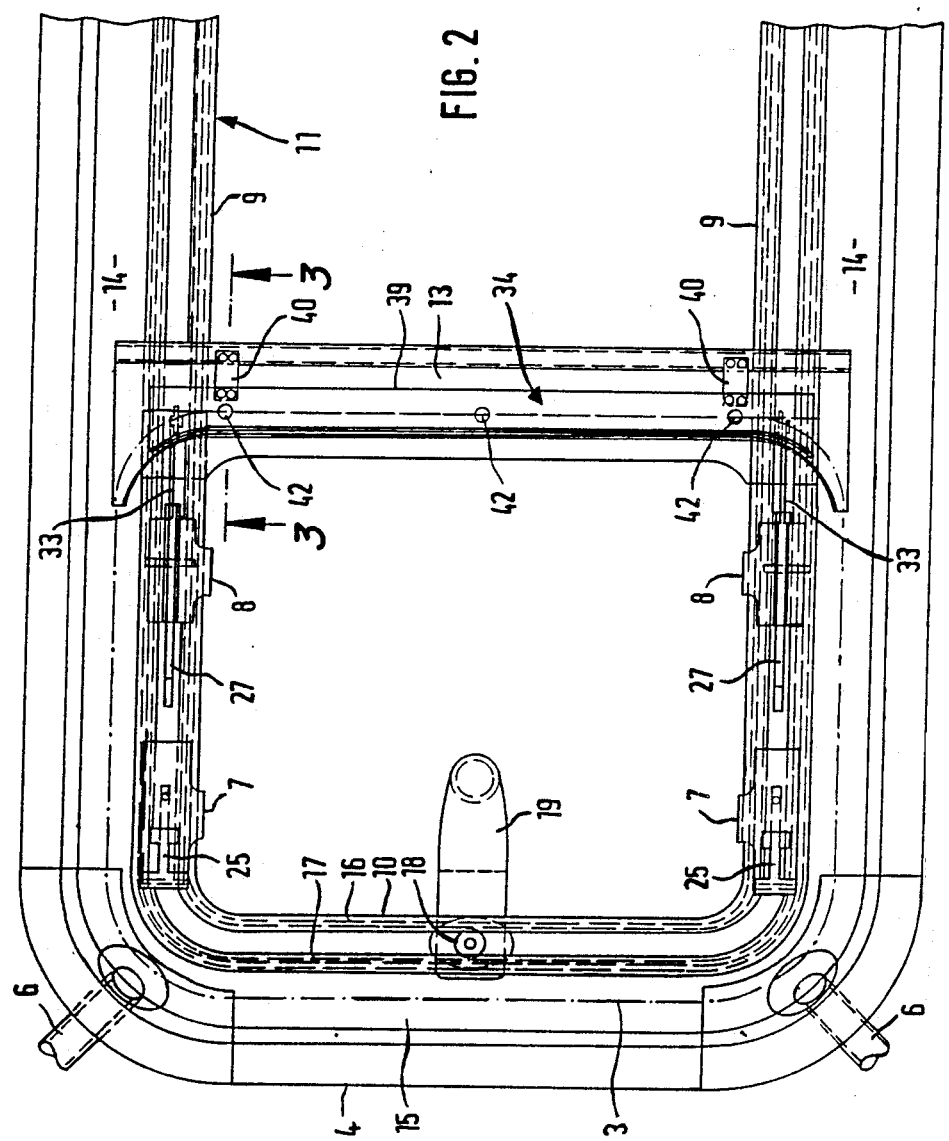

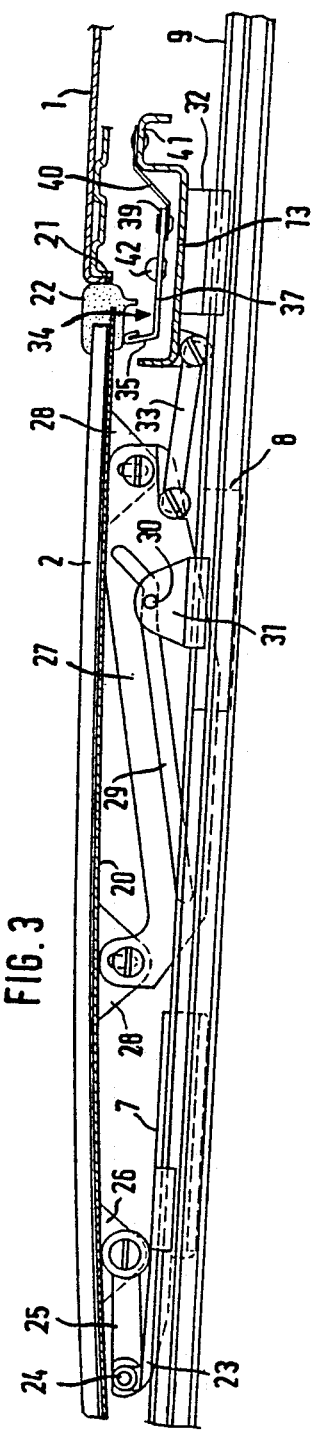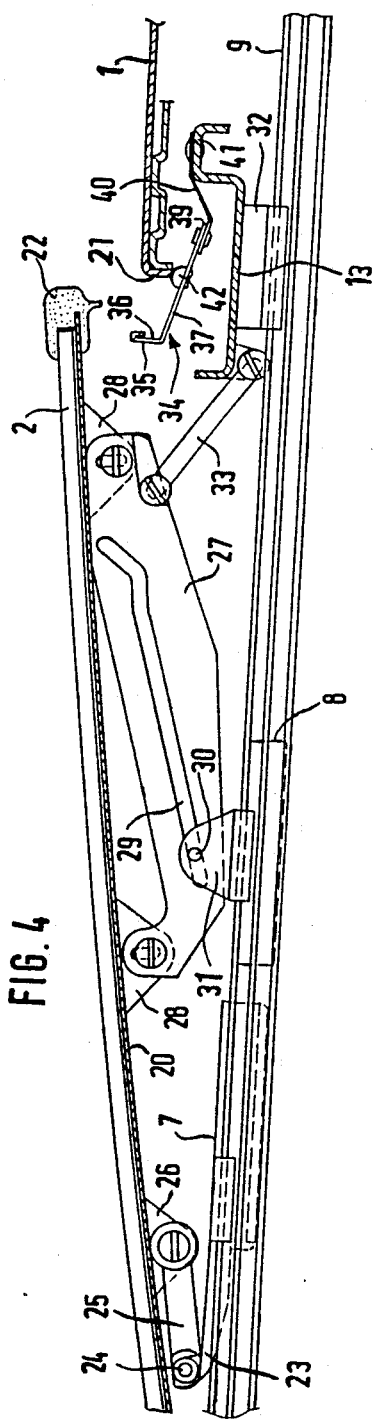

SLIDING LIFTING ROOF FOR MOTOR VEHICLES

BACKGROUND OF THE INVENTION

This invention relates to a sliding lifting roof for a motor vehicle.

Such a roof is known in which a rigid sliding cover is guided with front and rear guide shoes on guide rails fixed laterally in the roof opening, is driven by compressively rigidly guided cables acting on the rear guide shoes, is pivotably mounted by means of swivel bearings fitted to the front guide shoes about a horizontal axis at right angles to the sliding direction and equipped along its lateral edges with guide links fixed thereto. Guide pins fitted to the rear guide shoes engage in the guide links and, in the vicinity of the trailing edge of the sliding cover, further facing guide shoes on both sides are displaceably guided on guide rails and firmly interconnected by a water deflector underpinning the cover trailing edge and follow the cover displacement by articulation on the sliding cover. The deflector has a roughly upwardly open U-profile shape and terminates on both sides with outlet openings above water draining channels.

In the case of such a known sliding lifting roof (German Patent No. 25 32 187), when the sliding cover is open, there is a risk that precipitation or washing water on the rear, fixed roof surface will not or will not completely pass into the water deflector when the vehicle is subject to braking and instead is thrown over the same into the vehicle interior.

For solving this known problem, it has already been proposed (DE-OS 34 42 599) to link the water channel with a tilting device, which on opening the cover brings the water channel into an inclined position such that the front edge of the channel forms a splash guard projecting upwards over the rear edge of the roof opening. When the vehicle brakes, water which has collected on the rear, fixed roof surface is intended to strike the splash guard and in this way pass into the water deflector, from where it is passed in conventional manner to the lateral water channels.

In this known construction of a sliding lifting roof, it is consequently necessary to provide a complicated tilting device, which ensures that on opening the cover the water deflector is brought into the desired inclined position. In the upper part of the front edge of the water deflector, the splash guard comprises a flexible splash guard strip, which simultaneously is intended to seal against the underside of the sliding cover when the latter is closed. The flexibility of the splash guard strip necessary for these reasons can, when travelling, lead to vibrations of the strip and therefore to undesired humming noises. In addition, the known arrangement is only effective if the water quantity to be trapped is relatively small. By tilting the water deflector into an inclined position, the water absorption cross-section of said deflector is significantly reduced. If there is so much water on the rear, fixed roof surface that the absorption and draining capacity of the water deflector is exhausted, there is a risk of the excess water passing as a surge over the flexible splash guard strip. The latter process is assisted by the flexibility of said splash guard strip, which during the braking process is exposed to a significant water pressure through the forwardly flowing water. In this known arrangement, there is also an overflow risk in the outer, lateral areas of the water deflector if the water which has collected therein cannot pass sufficiently rapidly into the lateral water channels. Thus, excess water can pass out of the lateral regions into the vehicle interior, particularly as the flexible splash guard strip in said regions can either no longer project adequately far upwards over the rear edge of the roof opening, or in fact terminates before the lateral edges of the roof opening.

SUMMARY OF THE INVENTION

It is therefore an object to provide a sliding lifting roof, in which in a simple and reliable manner and without any need for a tilting position of the water deflector, it is ensured that when the sliding cover is open, even large amounts of water flowing forwards from the rear, fixed roof surface on braking is reliably collected and transferred into the water deflector. When travelling, the arrangement must not lead to any disturbing, noise-generating vibrations.

According to the present invention, there is provided a sliding lifting roof for a motor vehicle with a rigid sliding cover, which is guided with front and rear guide shoes on guide rails fixed laterally in the roof opening, there being in the vicinity of the trailing edge of the sliding cover a further guide shoe on each side which are displaceably guided on guide rails and firmly interconnected by a water deflector underpinning the trailing edge of the cover and follow the cover displacement by articulation on said sliding cover, said deflector having a substantially upwardly open U-shape and terminating on both sides with outlet openings above lateral water draining channels, and there being a splash guard projecting upwards over a rear edge of the roof opening when the sliding cover is open, the splash guard being formed by a non-deformable water trapping strip arranged in vertically displaceable manner with respect to the water deflector and having a water draining edge located to drain water into the open profile of the water deflector.

The invention makes partial use of per se known features (DE OS 34 42 599). The inventive fitting of a non-deformable and vertically displaceable water trapping strip on the water deflector makes it possible for the latter to remain in its normal untilted position, so that the full water absorption capacity is retained, also in the presently considered, critical travelling state. Due to the non-deformability of the water trapping strip, it is ensured that no noise-generating vibrations can occur. The water trapping strip can be constructed in different ways, provided that it is ensured that its water draining edge is located above the profile opening of the water deflector, so that trapped, collected water is reliably removed at the water deflector.

Preferably, the water trapping strip has an L-shaped profile with a shorter leg forming the splash guard, whilst the outer edge of the leg which is longer constitutes the water draining edge. This L-shaped profiling of the water trapping strip on the one hand ensures a reliable trapping of large quantities of water and on the other hand permits the space-saving housing of the strip in the upper region of the absorption area of the water deflector when the sliding cover is closed. The upper edge of the shorter leg engages sealingly from below on the marginal gap seal.

To ensure that the water trapping strip is also effective in the lateral regions of the roof opening, it is advantageous, at least in the vicinity of the splash guard, to ensure that the water trapping strip extends substantially as far as the lateral water channels.

Preferably, the splash guard is bent on its lateral ends so as to follow with a substantially constant spacing the curvature of the corners of the roof opening, which are rounded and this ensures that the water trapping strip is also effective at its edges, i.e. in the lateral regions of the roof opening, because this ensures that a constant gap is maintained between the splash guard and the rounded corners of the roof opening.

In a further development, the water trapping strip is supported on the water deflector by means of a spring arrangement, which biasses the water trapping strip in the sense of an upward displacement. This ensures that the water trapping strip is automatically displaced upwards into its operating position when the sliding cover is opened and only simple means are required for this. For example, the spring arrangement can comprise at least two spaced leaf springs, which are fixed to the water trapping strip and to the water deflector.

The longer leg of the water trapping strip can be arranged substantially parallel to the bottom surface of the water deflector so as to be spaced therefrom when the sliding cover is closed and in the vicinity of its water draining edge can be connected to the leaf springs, which are bent upwards and fixed to a folded edge of the water deflector above the bottom surface thereof. This construction ensures that the strip and all elements connected thereto remain above the water-carrying zone of the water deflector, even when the sliding cover is closed, which is advantageous for reducing corrosion.

Preferably, rubber buffers or the like are fixed to the water trapping strip, which strike from below against the fixed vehicle roof, thereby limiting the upwards displacement path of the water trapping strip when the cover is open. This ensures that when the sliding cover is open, no rattling noises can occur due to the engagement of the water trapping strip on the fixed vehicle roof. Through corresponding dimensioning of the rubber buffers used for this, it is possible to influence the degree of protection of the splash guard over the rear, fixed roof surface.

BRIEF DESCRIPTION OF THE DRAWINGS

For a better understanding of the invention and to show how the same may be carried into effect, reference will now be made, by way of example, to the accompanying drawings, in which:

FIG. 2 is a plan view of an associated guide frame, including the working parts of the sliding lifting roof structure fitted thereto, FIG. 3 is a section taken along line III—III in FIG. 2 with the sliding cover closed, and FIG. 4 is a section corresponding to FIG. 3, but with the sliding cover open.

DESCRIPTION OF PREFERRED EMBODIMENT

Figure 1:
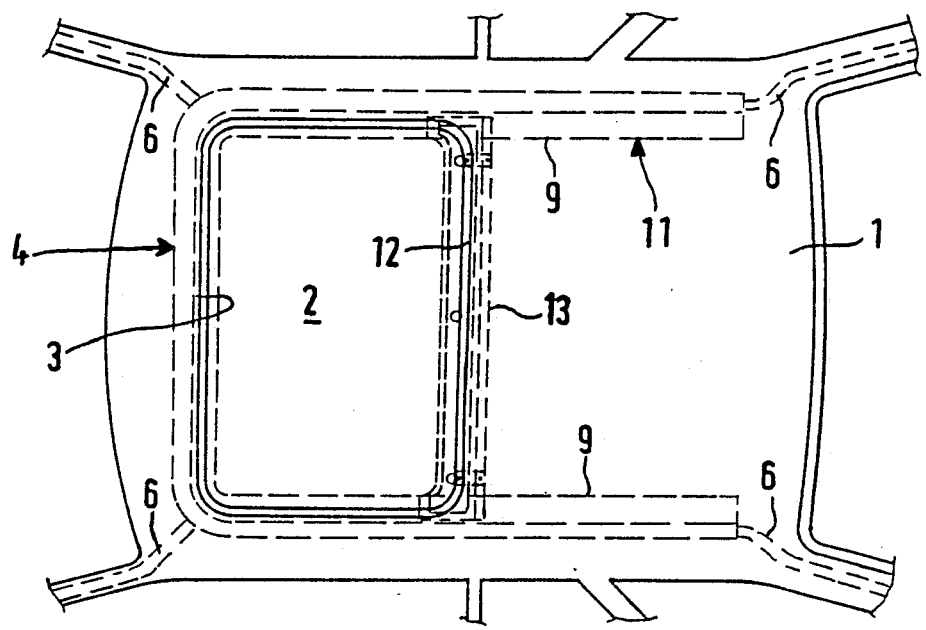
FIG. 1 is a broken-away plan view of a motor vehicle sliding lifting roof with the sliding cover closed.

The diagrammatic representation of a vehicle roof in FIG. 1 reveals a fixed vehicle roof 1, in whose front region is provided a roof opening 3 closable by a sliding cover 2. Below the fixed vehicle roof 1 is fixed a sliding roof frame 4 surrounding the roof opening 3 on three sides and to which are connected water drains 6 passed through window columns of the motor vehicle. In a manner to be described in greater detail hereinafter, the sliding cover 2 is displaceably guided on lateral guide rails 9 with front guide shoes 7 and rear guide shoes 8 which, in the embodiment shown, together with a front guide part 10 connecting them, form a through, constant-profiled guide frame 11, which is in one piece with the sliding roof frame 4 in the present case. Above the guide frame 11 is located a water deflector 13 underpinning a rear marginal gap 12 and which in cross-section has an upwardly open U-profile shape (FIGS. 3 and 4) and is open on both sides for forming outlet openings, which terminate above water channels 14 of the sliding roof frame 4. The water drains 6 are connected to the water channels 14, which are interconnected through a front channel 15.

The sliding cover is not shown in FIG. 2, but the latter indicates by a dot-dash line the roof opening 3. The sliding cover 2 is driven by cables 16 and 17 guided in a compressively rigid manner in corresponding channels of the guide frame 11 and which are only intimated in FIG. 2, whilst meshing in the vicinity of the front guide part 10 with thread windings fitted thereto in the manner of a rack and pinion drive with a pinion 18, which is rotatably mounted and driveable by a crank 19. Rotations of the crank 19 and therefore the pinion 18 ensure displacements of the two cables 16, 17 in opposite directions, one of the cables being in each case in non-positive connection with one of the rear guide shoes 8. The detailed construction of the driving means for the sliding cover is not important for the purposes of the present invention, so that no further description will be given. Obviously the sliding cover could also be driven in known manner by an electric motor. In all cases the sliding and pivoting operations of the sliding cover ar brought about by the same drive.

The rigid sliding cover 2, in the embodiment shown in FIGS. 3 and 4 is constituted by a transparent glass cover, which is fixed to a sliding cover reinforcement 20 and which seals by a marginal gap seal 22 engaged all around the same with respect to the all-round folded edge 21 of the fixed vehicle roof 1 bounding the roof opening 3.

FIGS. 3 and 4 only show the sliding lifting roof arrangement on the right-hand side as viewed in the intended direction of travel. The arrangement on the opposite, left-handside is homologous, so that only one side, namely that shown, will be described hereinafter. The front guide shoe 7 has a forwardly-directed swivel bearing projection 23, which is articulated by means of a bearing bolt 24 to a rearwardly directed connecting lever 25, whose free end is in fixed, but vertically adjustable connection with a clip 26 fitted to the sliding cover reinforcement 20. The bearing bolt 24 forms the front swivel bearing of the sliding cover 2 and consequently a horizontal axis at right angles to the sliding direction and about which the sliding cover 2 is pivotably mounted.

Along the lateral edge of the sliding cover 2 a guide link 27 is vertically adjustably fixed by means of fastening clips 28 to the sliding cover reinforcement 20. The guide link 27 contains a link slot 29, in which a guide pin 30 engages, which is fixed to an upwardly-directed projection 31 of the rear guide shoe 8. The shape and dimensions of the guide slot 29, in conjunction with the displacement of the rear guide shoe 8 on the guide rail 9, define the direction and extent of the pivoting movement of the sliding cover 2 about the bearing bolt 24.

As can in particular be seen in FIGS. 3 and 4, a further guide shoe 32 is mounted in displaceable manner in the vicinity of the rear edge of the sliding cover 2 on the guide rail 9 and which due to the homologous nature of the arrangement has a counterpart on the opposite side of the sliding cover. These two additional guide shoes 32 are firmly interconnected by the water deflector 13. The water deflector 13 is connected by means of linkages 33 to the sliding cover 2 and in the embodiment shown with the guide links 27 fixed to the sliding cover reinforcement 20 of the sliding cover 2. As a result of this articulation, the movements of the sliding cover 2 control the displacement of the water deflector 13 on the guide rails 9. The water deflector 13 has an upwardly open, U-profile shape, which is open to the sides (FIG. 2), so that water collected by the water deflector is supplied from its two ends to the water channels 14 located below it.

A more detailed description will now be given of the construction of the sliding lifting roof, with reference to FIGS. 2 to 4.

A water collecting or trapping strip 34 is fixed in a manner to be described to the water deflector 13. The water trapping strip 34 is L-shaped in cross-section, the shorter profile leg 35 with its inner face essentially forming a splash guard 36. The longer profile leg 37 is parallel to the bottom of the water deflector 13 when the sliding cover 2 is closed (FIG. 3), but there is an adequate spacing between it and the bottom surface. A water draining edge 39 is formed by the outer edge of the longer profile leg 37. The water draining edge is always located within the profile opening of the water deflector 13, so that water penetrating over the marginal gap 12 when the sliding cover 2 is closed, together with splashed water penetrating with the cover 2 open and trapped by the water trapping strip 34 always passes into the profile cavity of the water deflector 13. As illustrated in FIG. 2, there is no need for the length of the water collecting strip 34 to correspond to the length of the water deflector 13. However, it is important that the splash guard 36 extends from one water channel 14 to the other, so that splashed water from the rear, fixed roof surface 1 can always be drained off sideways into the water channels 14. As can be seen in FIG. 2 the splash guard 36 or the shorter profile leg 35 forming it is bent at the lateral ends to follow the curvature of the rounded corners of the roof opening 3. Thus, between the roof opening 3 and the splash guard 36 a through gap of constant width is formed, so that, also in the lateral regions, splashed water is passed without any damming effect and without any overflow over the splash guard 36 to the longer profile leg 37 of the water trapping strip 34 and therefore to the water deflector 13.

The water trapping strip 34 is vertically displaceably arranged by approximately S-shaped leaf springs 40, which are on the one hand fixed to the longer profile leg 37 and on the other to a horizontal folded edge 41 of the water deflector 13. The vertical displacement is controlled by pivoting movements of the sliding cover 2, the leaf springs 40 acting in the manner of bending hinges. The leaf springs 40 are constructed in such a way that, in the position shown in FIG. 3, they are pretensioned in the sense of an upward displacement of the splash guard 6. The outer edge of the shorter profile leg 35 engages from below on the facing area of the marginal gap seal 22.

If the sliding cover is opened upwards starting from the position shown in FIG. 3, the water trapping strip under the action of the leaf springs 40 follows with a pivoting movement until rubber buffers 42 fixed to the longer profile leg 37 and which project upwards strike against the lower face of the folded edge 21 so as to limit the movement. In this position shown in FIG. 4, the splash guard 37 projects upwards over the rear edge of the roof opening, so that in the case of the vehicle braking during forward travel, water draining from the fixed vehicle roof 1 strikes the splash guard 36 and is passed via the longer profile leg 37 to the water deflector 13. The rubber buffers 42 can also have a space-maintaining function, so that the water trapped by the water trapping strip can pass through the gaps formed by the rubber buffers 42 between the folded edge 21 and the longer profile leg 37. In the embodiment shown in FIG. 2 there are three rubber buffers 42. Through the manufacture of the water trapping strip 34 from sheet metal or a suitable rigid plastics material, the water trapping strip is undeformable, i.e. relatively inflexible and this is helped by its L-shaped profiling.

As can be gathered from FIG. 3, the water trapping strip 34 is at such a distance above the base surface of the water deflector 13 when the sliding cover 2 is closed, that it can still resiliently give way downwards when the sliding cover 2 is lowered with its trailing edge downwards, so that the sliding cover 2 can move under the rear, fixed vehicle roof 1.

We claim:

1. A sliding lifting roof for a motor vehicle comprising a rigid sliding cover having a trailing edge, which cover has front and rear guide shoes and guide rails fixed laterally in a roof opening of a fixed vehicle roof, the cover being guided by said guide shoes, there being on each side of the trailing edge of the sliding cover a further guide shoe which are each displaceably guided by a respective guide rail, a water deflector firmly interconnecting the further guide shoes and forming an upwardly open U-profile shape beneath the trailing edge of the cover and following the cover displacement by articulation means on said sliding cover, said deflector terminating on both sides with outlet openings above lateral water draining channels, and there being a splash guard projecting upwards to an elevation above a rear edge of the roof opening when the sliding cover is open, the splash guard being formed by a substantially rigid water trapping strip arranged in vertically displaceable manner with respect to the water deflector and said splash guard having a water draining edge located on drain water into the open profile of the water deflector.

2. A roof according to claim 1, wherein the water trapping strip has a substantially L-shaped profile with a shorter leg and a longer leg, the shorter leg of which forming the splash guard, whilst the outer edge of the longer leg constitutes said water draining edge.

3. A roof according to claim 1, wherein at least in the vicinity of its splash guard, the water trapping strip extends substantially as far as the lateral water channels.

4. A roof according to claim 2, wherein the splash guard is bent on its lateral ends so as to follow with a substantially constant spacing the curvature of the corners of the roof opening, which are rounded.

5. A roof according to claim 1, wherein the water trapping strip is supported on the water deflector by means of a spring arrangement, which biasses the water trapping strip in the sense of an upward displacement.

6. A roof according to claim 5, wherein the spring arrangement comprises at least two spaced leaf springs, which are fixed to the water trapping strip and to the water deflector.

7. A roof according to claim 2, wherein the longer leg of the water trapping strip is arranged substantially parallel to the bottom surface of the water deflector and is spaced therefrom when the sliding cover is closed and in the vicinity of its water draining edge is connected to two spaced leaf springs, which are bent upwards and fixed to a folded edge of the water deflector above the bottom surface thereof and to the water trapping strip.

8. A roof according to claim 1, wherein rubber buffers are fixed to the water trapping strip, which strike from below against the fixed vehicle roof, thereby limiting the upwards displacement path of the water trapping strip when the cover is open.

9. A roof according to claim 1, wherein said sliding cover is pivotably mounted by means of swivel bearings fitted to the front guide shoes about a horizontal axis at right angles to the guide rails and said sliding cover being equipped along its lateral edges with an opposed pair of guide links fixed thereto, each link being engaged to an opposed guide pin fitted to a respective rear guide shoe.

* * * * *